United States Patent
Almassian et al.

(10) Patent No.: US 12,220,675 B2
(45) Date of Patent: Feb. 11, 2025

(54) DEVICE AND METHOD FOR MIXING AND BUBBLE REMOVAL

(71) Applicant: Tetracore, Inc., Rockville, MD (US)

(72) Inventors: David R. Almassian, Gaithersburg, MD (US); William M. Nelson, Rockville, MD (US); Aymeric Randanne de Vazeille, Leesburg, VA (US)

(73) Assignee: Tetracore, Inc., Rockvile (MD)

( * ) Notice: Subject to any disclaimer, the term of this patent is extended or adjusted under 35 U.S.C. 154(b) by 906 days.

(21) Appl. No.: 17/173,315

(22) Filed: Feb. 11, 2021

(65) Prior Publication Data
US 2021/0162357 A1 Jun. 3, 2021

Related U.S. Application Data

(62) Division of application No. 15/255,891, filed on Sep. 2, 2016, now Pat. No. 10,953,376.

(60) Provisional application No. 62/213,669, filed on Sep. 3, 2015.

(51) Int. Cl.
| | |
|---|---|
| *B01F 33/452* | (2022.01) |
| *B01D 19/00* | (2006.01) |
| *B01F 33/45* | (2022.01) |
| *B01F 33/451* | (2022.01) |
| *B01F 35/22* | (2022.01) |
| *B01F 35/32* | (2022.01) |

(52) U.S. Cl.
CPC ........ *B01F 33/452* (2022.01); *B01D 19/0052* (2013.01); *B01F 33/45* (2022.01); *B01F 33/451* (2022.01); *B01F 35/2207* (2022.01); *B01F 35/3202* (2022.01); *B01F 35/3204* (2022.01)

(58) Field of Classification Search
CPC ....... B01F 33/452; B01F 33/453; B01F 33/45
See application file for complete search history.

(56) References Cited

U.S. PATENT DOCUMENTS

| | | | |
|---|---|---|---|
| 4,040,605 A | | 8/1977 | Towsend |
| 4,132,511 A | | 1/1979 | Boehme et al. |
| 4,372,394 A | | 2/1983 | Allegri, Sr. |
| 4,390,283 A | | 6/1983 | Meyer |
| 4,477,192 A | | 10/1984 | Bonney |
| 4,876,069 A | | 10/1989 | Jochimsen |
| 5,028,142 A | | 7/1991 | Ostoich et al. |
| 5,352,036 A | | 10/1994 | Haber et al. |
| 5,529,391 A | | 6/1996 | Kindman et al. |
| 6,126,904 A | * | 10/2000 | Zuellig ............... B01J 19/0046 422/138 |

(Continued)

FOREIGN PATENT DOCUMENTS

DE 19724046 A1 * 12/1998 ............. B01F 13/04

*Primary Examiner* — Marc C Howell
*Assistant Examiner* — Patrick M McCarty
(74) *Attorney, Agent, or Firm* — Finnegan, Henderson, Farabow, Garrett & Dunner, LLP

(57) ABSTRACT

A magnetic mixing device designed to mix fluid in a reaction chamber and remove air bubbles if present. The device comprises a holder with embedded magnets, which causes movement of a stir bar within the reaction chamber. The holder may be moved by an electric linear actuator configured to generate linear motion or an electric motor configured to generate a circular motion. When orientated so the stir bar moves vertically within the reaction chamber, the stir bar disrupts any air bubbles trapped within or below the fluid.

11 Claims, 2 Drawing Sheets

(56) References Cited

U.S. PATENT DOCUMENTS

| | | |
|---|---|---|
| 6,247,840 B1 | 6/2001 | Gaffar |
| 6,318,191 B1 | 11/2001 | Chen |
| 6,382,827 B1 | 5/2002 | Gebrian |
| 6,467,946 B1 | 10/2002 | Gebrian |
| 6,748,332 B2 | 6/2004 | Chen |
| 6,776,966 B2 | 8/2004 | Gebrian et al. |
| 6,855,540 B2 | 2/2005 | Farina et al. |
| 6,880,384 B2 | 4/2005 | Hvidtfeldt et al. |
| 7,153,021 B2 | 12/2006 | Goodwin et al. |
| 7,337,072 B2 | 2/2008 | Chen |
| 8,211,301 B2 | 7/2012 | Safar et al. |
| 8,567,455 B2 | 10/2013 | Saranow et al. |
| 8,728,311 B2 | 5/2014 | Safar et al. |
| 9,731,254 B2 | 8/2017 | Gunia et al. |
| 2003/0029254 A1 | 2/2003 | Hvidtfeldt et al. |
| 2007/0019502 A1 | 1/2007 | Foley et al. |
| 2007/0140902 A1* | 6/2007 | Calatzis ............... G01N 33/86 422/400 |
| 2010/0046323 A1 | 2/2010 | Tien et al. |
| 2011/0064613 A1 | 3/2011 | Chen |
| 2012/0276574 A1* | 11/2012 | Low ..................... B01F 27/805 436/86 |
| 2014/0219046 A1* | 8/2014 | Cracauer ............... B01F 33/452 366/144 |
| 2014/0287955 A1* | 9/2014 | Wende ................. C12Q 1/6888 435/7.1 |
| 2014/0334249 A1 | 11/2014 | Radow |
| 2015/0053481 A1 | 2/2015 | Baym et al. |
| 2015/0136604 A1 | 5/2015 | Nielsen et al. |
| 2015/0368601 A1* | 12/2015 | Whitman ................. B01L 7/52 435/286.2 |
| 2017/0065946 A1 | 3/2017 | Almassian et al. |
| 2017/0197213 A1 | 7/2017 | Nielsen et al. |
| 2017/0333916 A1 | 11/2017 | Kamees et al. |
| 2017/0368511 A1 | 12/2017 | Gunia et al. |

* cited by examiner

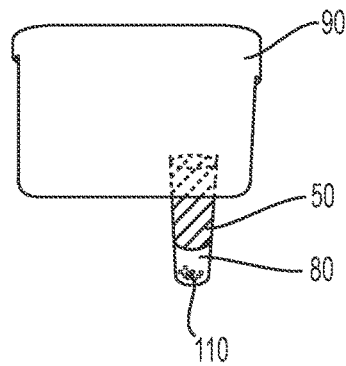
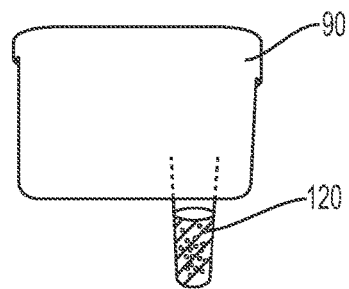
FIG. 3A  FIG. 3B
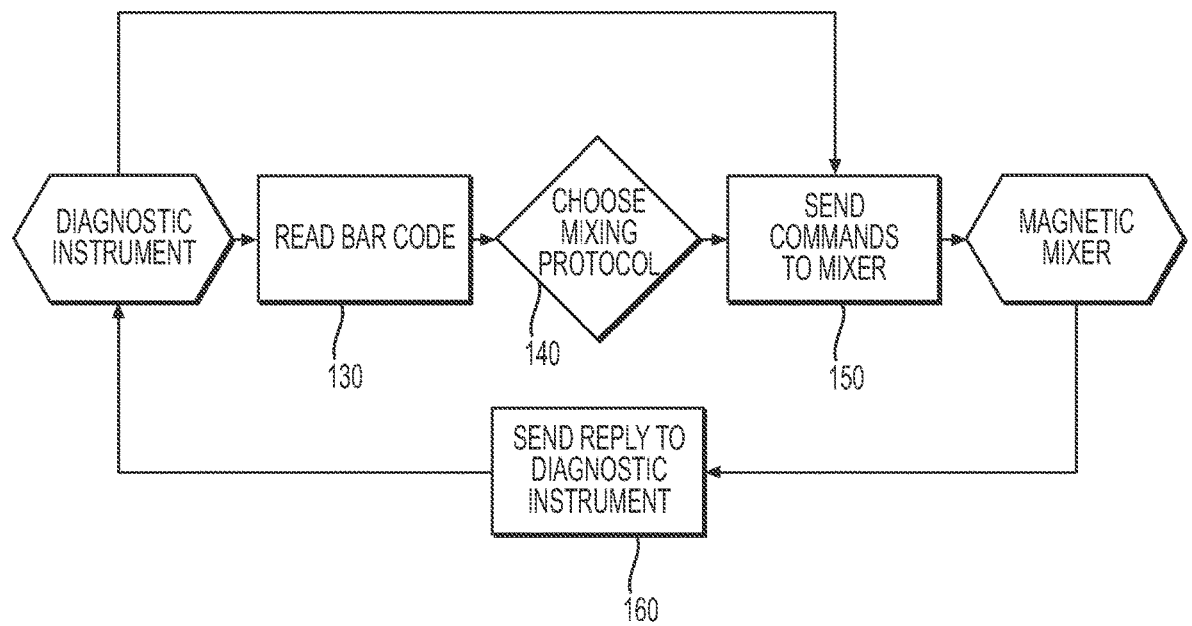
FIG. 4

DEVICE AND METHOD FOR MIXING AND BUBBLE REMOVAL

PRIORITY CLAIM

This application is a division of U.S. application Ser. No. 15/255,891, filed Sep. 2, 2016, which claims priority from U.S. Provisional Patent Application No. 62/213,669 filed on Sep. 3, 2015, both of which are hereby incorporated by reference in their entirety in the present application.

BACKGROUND

Technical Field

The present disclosure relates to the field of mixing devices and mixing methods, and in particular, to a magnetic mixing device and method for using a magnetic spin bar to circulate fluid and remove air bubbles within a reaction chamber.

Background

The mixing of solutions is routinely used in many industrial processes and is often essential in some chemical and biological reactions. Mixing is beneficial in any chemical or biological reaction where an equal and homogeneous concentration is needed throughout the solution.

In biotechnology, mixing is generally performed by methods such as pipette mixing or vortexing. There are advantages and disadvantages of each method, for example, mixing may yield variability between samples.

Biotechnology companies use extensive amounts of culture media, buffers, and reagents. Such materials originally come in powdered form and must be rehydrated prior to use. Rehydrating the reaction components reduces reaction time and improves consistency between reactions.

In one area of biotechnology where rehydration of reaction components is done for nucleic acid amplification, the reaction components may be rehydrated by pipette mixing or vortexing, or thermal mixing before the reaction begins. Pipette mixing requires both specialized laboratory skills and specialized laboratory equipment. Vortexing requires specialized laboratory equipment that is not typically battery operated or portable. Both vortexing and pipette mixing are variable, depending on the manner in which the operator performs the process. For example, there may be variability in the number of times the fluid is cycled through the micropipette or the duration of vortexing. Thermal mixing occurs during the temperature cycling, however optimal amplification may be delayed a few cycles until the solution is properly mixed. Thermal mixing is time-consuming, often taking approximately 10 minutes for the reaction solution to become thoroughly mixed. When using the invention, all parameters of the process are controlled, for example motor ramp up rate, motor revolutions per minute, motor duration at maximum revolutions per minute, and motor ramp down rate.

Air bubble(s) may get trapped within or beneath the fluid. Traditionally, the air bubble is removed by methods such as a centrifugation or pipette mixing. Another common method of removing air bubbles is tapping the reaction plate or the tube. In a magnetic mixer where the stir bar rotates at the bottom of the reaction chamber, the air bubble may not be disrupted and may remain at the bottom of the reaction chamber. An air bubble can cause inconsistent results for a number of reasons including reducing the effective volume of the reaction, preventing the reaction from achieving the appropriate reaction temperatures, interfering with a detector, and preventing the complete mixing of reaction components.

A device that quickly rehydrates dried reaction components, produces evenly distributed mixing throughout the reaction volume, and removes air bubbles in a reaction chamber is highly desirable. It is also advantageous if this device is designed so any operator can use it, so it does not require a trained technician. Therefore, it is desirable that the device be configured to alert a user if the device is not operating properly.

SUMMARY

The present disclosure is directed to a magnetic mixer that can be used for mixing in any chemical or biological application. It is to be understood that the term "mix" in this disclosure refers to any movement that creates a uniform solution, e.g. mix, stir, blend, agitate, etc.

It is to be understood that the term "holder" in this disclosure refers to any mechanical expedient, e.g. support, spindle, bracket, prop, etc.

Consistent with a disclosed embodiment, a device is disclosed that quickly mixes solutions and removes air bubbles that may be present in the reaction chamber. One application of the device and method of the present disclosure is the quick rehydration of dried reaction components by a magnetic mixer. In a nucleic acid amplification assay, for example, the dried down reaction components must be rehydrated to re-suspend reagents, reduce reaction time and improve consistency between reactions. Dried down reaction components may include, but are not limited to, polymerase chain reaction (PCR) primers, PCR probes, nucleotides, taq polymerase, magnesium chloride, Bovine Serum Albumin, trehalose, and PCR buffer. Dried reaction components may also include, but not be limited to, NASBA, RPA, HDA, LAMP, RCA, ICAN, SMART, SDA, and LDR reaction components.

The geometry of a reaction chamber could cause air bubble(s) to be trapped within or beneath the fluid. The present disclosure describes devices and methods that address both challenges of quick mixing and removing trapped air bubbles.

Consistent with an exemplary embodiment of the present disclosure, a device is disclosed that detects when a magnetic stir bar is moving within a reaction chamber. A control unit detects a change in current to a motor due to the presence of a magnetic stir bar and a feedback loop provides data to a magnetic mixing device or a master instrument. A lack of change in current to a motor represents the absence of a magnetic stir bar within a reaction chamber. The feedback loop to a master instrument can alert an untrained user to the absence of the magnetic stir bar and any other potential problems with the magnetic mixing device.

Additionally, a device is disclosed that contains at least two magnetic stir bars of a shape that promotes a grinding-type action to breakdown a sample.

The accompanying drawings, which are incorporated in and constitute a part of this specification, illustrate various embodiments and together with the description, serve to explain the principles of the various aspects of the embodiments. Other embodiments of this disclosure are disclosed in the accompanying drawings, description, and claims. Thus, this summary is exemplary only, and is not to be considered restrictive.

BRIEF DESCRIPTION OF DRAWING(S)

The accompanying drawings, which are incorporated in and constitute a part of this specification, illustrate the disclosed embodiments and together with the description, serve to explain the principles of the various aspects of the disclosed embodiments. In the drawings:

FIGS. 3A and 3B illustrate an air bubble trapped by the introduction of a liquid, represented by hatched lines, to the reaction chamber and the removal of the air bubble after mixing;

FIG. 4 illustrates the logic of a master instrument controlling the magnetic mixing device, in accordance with an exemplary embodiment of the present disclosure.

It is to be understood that both the foregoing general description and the following detailed description are exemplary and explanatory only and are not restrictive of the claims.

DESCRIPTION OF EXEMPLARY EMBODIMENTS

Reference will now be made in detail to certain embodiments consistent with the present disclosure, examples of which are illustrated in the accompanying drawings. Wherever possible, the same reference numbers will be used throughout the drawings to refer to the same or like parts.

The present disclosure describes a magnetic mixing device. Exemplary embodiments may include a rare earth magnet that attracts and/or repels a paramagnetic stir bar.

The present disclosure further describes a device that removes trapped air bubbles beneath or within a fluid.

Figure 1:
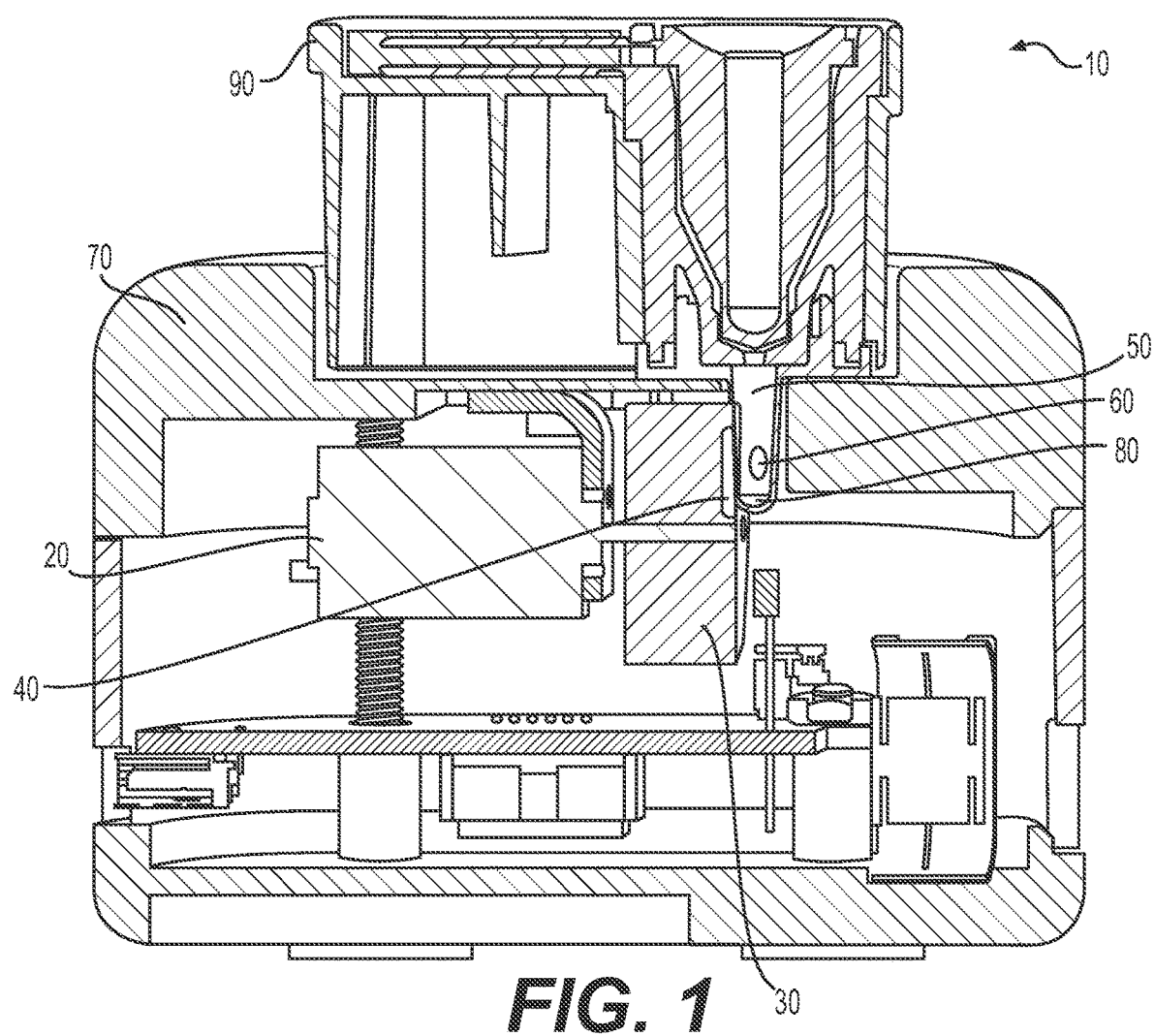
FIG. 1 illustrates a cross-sectional view of an exemplary embodiment of an exemplary magnetic mixer of the present disclosure.

FIG. 1 illustrates an exemplary magnetic mixing device 10 comprising a source of motive power 20, a holder 30 containing an embedded magnet 40, a reaction chamber 50, stir bar(s) 60, housed in an outer housing 70. The stir bar(s) 60 is is co-located within the reaction chamber 50.

In some embodiments, source of motive power 20 may be an electric motor, which in an illustrative embodiment is configured to generate a circular motion. In alternative embodiments, source of motive power 20 may be an electric linear actuator configured to generate linear motion. In other embodiments, the movement of magnet 40 may be performed without a motor or a linear actuator, for example, by hand or other manual means. The source of motive power 20 can also be mixed-mode, relying on more than one motor, actuator, manual motion, etc.

Another aspect of the present disclosure is holder 30 that contains one or more embedded magnet 40. In an exemplary embodiment, holder 30 is embedded with one rare earth magnet 40. In alternative embodiments, holder 30 has more than one rare earth magnet 40 embedded in holder 30. In alternative embodiments, magnet 40 is another type of permanent magnet. In alternative embodiments, magnet 40 is an electromagnet. In alternative embodiments, holder 30 itself is a permanent magnet or an electromagnet. In alternative embodiments, magnet 40 is moved relative to reaction chamber 50 without being embedded in a holder.

Reaction chamber 50 may be configured for various functionalities. In an exemplary embodiment, reaction chamber 50 may be optimized to perform a nucleic acid amplification reaction. In another exemplary embodiment, reaction chamber 50 may be contained within cartridge 90.

Another aspect of the present disclosure is one or more magnetic stir bar 60. The motion of stir bar 60 is driven by the movement of magnet 40. Exemplary shapes of stir bar 60 may include disc, rod, cross, ring, and any other shape or construction capable of mixing. The size of stir bar 60 should be coupled to the size of reaction chamber 50 to allow stir bar 60 to move unrestricted.

In exemplary embodiments, stir bar 60 may be stainless steel, though stir bar 60 may be any magnetic or paramagnetic material. The magnetic material of stir bar 60 may be coated or uncoated. In exemplary embodiments, stir bar 60 is coated with a material that does not react with or contaminate the reaction components. In an exemplary embodiment, stir bar 60 may be coated with parylene. In alternative embodiments, the coating may be any number of coatings other than parylene. In such embodiments, a preferred coating is one that has been FDA approved for use in food, drug, and cosmetic applications.

Another aspect of the present disclosure is housing 70, which is used to align source of motive power 20 and reaction chamber 50.

Holder 30 orientation relative to reaction chamber 50 may be in any manner that allows for movement of stir bar 60 within reaction chamber 50. In one embodiment, holder 30 is rotated parallel relative to reaction chamber 50. In another embodiment, holder 30 is rotated perpendicularly relative to reaction chamber 50, along the longitudinal axis of reaction chamber 50. In another embodiment, mixing device 10 is configured to allow reaction chamber 50 to sit at the center and holder 30 moves magnet 40 around reaction chamber 50. In an exemplary embodiment, holder 30 may be orientated to rotate alongside of reaction chamber 50 in a manner so that stir bar 60 moves vertically within reaction chamber 50.

Figure 2A:
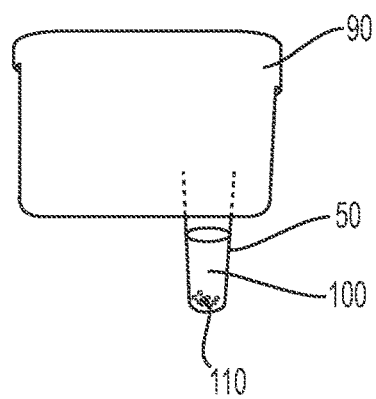
FIGS. 2A and 2B illustrate the complete mixing of the dried components within the reaction chamber before and after mixing.
Figure 2B:
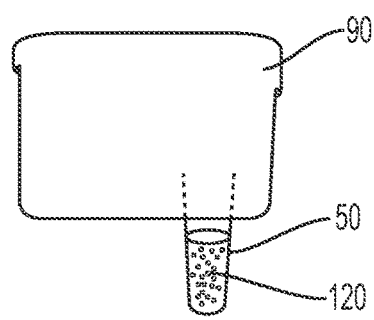

FIG. 2A illustrates the introduction of dried components 110 and fluid 100 within a reaction chamber 50. FIG. 2B illustrates the resulting uniform solution 120 after mixing in a magnetic mixing device of the present disclosure.

An air bubble 80 may be trapped at the bottom of reaction chamber 50 when fluid is introduced, as shown in FIG. 1 and FIG. 3A. In an orientation where stir bar 60 rotates at the bottom of reaction chamber 50, trapped air bubble 80 may not be removed by motion of stir bar 60. In an orientation that moves stir bar 60 vertically within reaction chamber 50, air bubble 80 trapped at the bottom of a narrow reaction chamber 50 can be disrupted and/or air bubble 80 can be forced to the top of reaction chamber 50.

FIG. 3A illustrates air bubble 80 trapped in a solution caused by the introduction of a liquid, represented by hatched lines, to reaction chamber 50 within cartridge 90. FIG. 3B illustrates the removal of the air bubble after mixing using a magnetic mixing device of the present disclosure.

In an embodiment where the fluid has a viscosity high enough that air bubbles 80 may be trapped within the fluid, such as a gel or cream, an orientation that moves stir bar 60 vertically within reaction chamber 50 may similarly disrupt air bubbles 80.

Further, an orientation that moves stir bar 60 vertically within reaction chamber 50 may result in a turbulent flow, rather than a predictable vortex. The vertical motion advantageously creates an evenly distributed mixing throughout the reaction volume.

It will be apparent to those skilled in the art that in embodiments where stir bar 60 is of a paramagnetic material, the distance between magnet 40 and stir bar 60 must be within range to effectively attract or repel stir bar 60 to cause the desired movement of stir bar 60 within reaction chamber 50.

In an embodiment where there is more than one reaction chamber 50, corresponding stir bar(s) 60 must be in each reaction chamber 50. They must be positioned adjacent to magnet 40 within a range to effectively attract or repel stir bars 60 to cause the desired movement within respective reaction chambers 50.

In an alternative embodiment, magnet 40 may be stationary without the use of a holder, and reaction chamber 50 may be moved relative to magnet 40 by source of motive power 20 in the form of an electric motor or other manual means.

The present disclosure may contain more than one magnetic stir bar 60, within reaction chamber 50, of a shape to optimize a grinding-type action to break down a sample.

In an alternative embodiment, a microprocessor controls the ramp rate and speed of the source of motive power 20, for instance a motor, and therefore stir bar 60. In an exemplary embodiment a master control unit controls magnetic mixing device 10 and selects a mixing protocol. The control unit may be part of a larger master instrument.

In such an embodiment, a control unit is configured to detect if magnetic stir bar 60 is within reaction chamber 50. A current necessary to run a motor serving as the source of motive power 20 without the presence of magnetic stir bar 60 is known. A control unit detects a difference in that current when magnetic stir bar 60 is present and moving within reaction chamber 50. A lack of a change in current may represent an absence of magnetic stir bar 60 within reaction chamber 50. A feedback loop provides input to magnetic mixing device 10 or a master instrument. An alert may be provided to a user regarding the absence of magnetic stir bar 60 and of any other potential problems with the magnetic mixing device.

In an alternative embodiment, a master device controls magnetic mixing device 10 as a slave device. In an exemplary embodiment, the master device is a master instrument that controls magnetic mixing device 10. FIG. 4 illustrates an exemplary logic of a master instrument in controlling a magnetic mixing device 10. By way of background, when an assay is developed, an optimal thermal protocol, mixing protocol, and results interpretation methodology is prescribed. These pieces of information can be advantageously encoded onto an information carrier, else contained in a database that can be referenced by indicia. The information carrier can be in an illustrative embodiment a bar code, such as a 2-D barcode, which can contain, or provide the location of such information, for example a thermal protocol ID, a mixing protocol ID, a results interpretation ID, the manufacturing lot number of the assay, the catalog number of the assay, etc. At step 130, the illustrative master instrument reads a bar code. At step 140, the master instrument chooses a mixing protocol. This can be accomplished, for instance, by reference to an online or offline database and/or filesystem to retrieve the information referred to by the ID number. At step 150, the master instrument sends commands to magnetic mixing device 10. At step 160, magnetic mixing device 10 sends a reply to the master instrument. In exemplary embodiments, the instrument may communicate with the bar code module over USB, by wired or by wireless communications. The command structure in an exemplary embodiment may be modified as necessary to communicate with the bar code module employed. However any other communication protocol could be used, for instance serial, RS232, RS485, SPI, I2C, WiFi direct, Bluetooth, etc. Imaging systems such as cameras are also envisioned for capturing data labels, for example QR codes. RFID or other electromagnetic-based information tags can also be used to encode the information described above in place of an optical system.

Another embodiment of the present disclosure provides a kit for amplifying DNA from dried reaction components. The kit may comprise a magnetic mixing device as described above, dried down reaction components, and a thermocycler for DNA amplification.

An exemplary method of mixing by magnetic mixing device 10 will now be described. In describing the exemplary method, it will be assumed that a user is operating magnetic mixing device 10 shown in FIG. 1. However, it should be understood that an automated, semi-automated, or manually operated machine could also operate device 10 in a similar manner.

A user may fill reaction chamber 50 with the desired substances to be mixed, provided there is at least one substance that is a fluid. At least one magnetic stir bar 60 must be inserted into reaction chamber 50, co-located with the substances to be mixed. Through movement of magnet 40 relative to a stationary reaction chamber 50 or movement of reaction chamber 50 relative to a stationary magnet 40, magnetic stir bar 60 moves within reaction chamber 50 to create turbulent flow and uniform mixing throughout. Alternatively, a user may receive reaction chamber 50 containing at least one of the desired substances to be mixed, and/or magnetic stir bar 60. Reaction chamber 50 may be contained within cartridge 90. In an embodiment where magnetic stir bar 60 moves vertically throughout reaction chamber 50, any air bubbles 80 present within or beneath the fluid are disrupted and/or moved to the top of reaction chamber 50.

In an exemplary embodiment, a microprocessor may control the ramp rate and the speed of a motor serving as the source of motive power 20.

In an exemplary embodiment where magnetic mixing device 10 is used for nucleic acid amplification, a user fills reaction chamber 50 with dried reaction components 110 and a liquid. Through the use of magnetic mixing device 10, the dried reaction components 110 are rehydrated in the liquid. Alternatively, the user may receive reaction chamber 50 with dried reaction components 110 and magnetic stir bar 60 already within reaction chamber 50. Reaction chamber 50 may be contained within cartridge 90.

In an exemplary embodiment, magnetic mixing device 10 may be used before the reaction chamber is placed in a master instrument.

In an alternative embodiment, magnetic mixing device 10 may be used during the run on a master instrument. At a specified time, the user may remove the reaction chamber from the master instrument, place the reaction chamber in magnetic mixing device 10, run a mixing protocol, and place the reaction chamber back in the master instrument.

In an alternative embodiment, one or more magnetic mixing devices may be incorporated as part of a master instrument, rather than as an accessory that communicates with a master instrument.

Table 1 presents data from a set of experiments where the magnetic mixing device was used for nucleic acid amplification. The data indicates the cycle threshold comparison between magnetic mixing, thermal mixing, and pipette mixing. The cycle threshold is the number of cycles of amplification required to cross a threshold value. The data shows magnetic mixing is equal to or better than conventional thermal mixing or pipette mixing, with the added advantages of being faster and allowing an unskilled user to operate the magnetic mixing device.

TABLE 1

Comparison between Magnetic Mixing, Thermal Mixing, and Pipette Mixing

| Assay | Magnetic Mixing | Thermal Mixing | Pipette Mixing |
|---|---|---|---|
| Type 1 | 29.4 | 30.1 | 30.4 |
| Type 1 | 30.3 | 30.4 | 30.1 |
| Type 2 | 33.8 | 36 | not tested |
| Type 2 | 34.2 | 36.1 | not tested |
| Type 1 | 31.4 | 33.7 | not tested |
| Type 1 | 30.8 | 33.8 | not tested |
| Type 1 | 31.4 | 35 | not tested |
| Type 1 | 31.3 | 33 | not tested |
| Type 1 | 29.9 | 30.7 | not tested |
| Type 2 | 37.5 | not tested | 36.8 |
| Type 2 | 37.4 | not tested | 37.2 |
| Type 2 | 37.7 | not tested | 37.9 |
| Type 2 | 37.3 | not tested | 37.9 |
| Type 2 | 35.5 | not tested | 38.4 |
| Type 2 | 38.3 | not tested | 37.8 |
| Type 2 | 37.2 | not tested | 38.2 |
| Type 2 | 37.9 | not tested | 38.5 |

The foregoing description has been presented for purposes of illustration. It is not exhaustive and is not limited to the precise forms or embodiments disclosed. Exemplary embodiments have been presented as being used for nucleic acid amplification, this disclosure is not limited to nucleic acid amplification and can be used for mixing in any chemical or biological application. Other embodiments will be apparent to those skilled in the art from consideration of the specification and practice of the embodiments disclosed herein.

Moreover, while illustrative embodiments have been described herein, the scope of any and all embodiments include equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. It is intended that the specification and examples be considered as exemplary only, with a true scope and spirit of the embodiments being indicated by the following claims and their full scope of equivalents.

What is claimed is:

1. A kit for amplifying DNA from dried reaction components, the kit comprising (a) a magnetic mixing device, (b) dried down reaction components, and (c) a thermocycler for DNA amplification, wherein the magnetic mixing device comprises:
   a reaction chamber, for mixing the reaction components;
   a magnetic stir bar within the reaction chamber;
   a holder containing a magnet embedded in an end face of the holder, the magnet being magnetically couplable to the magnetic stir bar; and
   a source of motive power coupled to the holder to rotate the holder about a rotation axis, the holder positioned adjacent to the reaction chamber, and the rotation axis being perpendicular to a longitudinal axis of the reaction chamber and extending below a bottom of the reaction chamber,
   wherein rotation of the holder causes movement of the magnetic stir bar in a direction vertical with respect to the bottom of the mixing device and along the longitudinal axis of the least one reaction chamber.

2. The kit of claim 1, wherein the magnet is a permanent magnet.

3. The kit of claim 1, wherein the magnet is an electromagnet.

4. The kit of claim 1, wherein the magnetic stir bar is made of stainless steel.

5. The kit of claim 1, wherein the magnetic stir bar is coated.

6. The kit of claim 1, wherein the reaction chamber is contained within a cartridge.

7. The kit of claim 1, wherein the dried reaction components are nucleic acid amplification reagents.

8. The kit of claim 1, further comprising a liquid for rehydrating the dried reaction components.

9. The kit of claim 1, wherein the dried reaction reagents are provided in the reaction chamber.

10. The kit of claim 1, wherein the magnetic stir bar is made of a paramagnetic material.

11. The kit of claim 10, wherein the magnetic stir bar is partially coated with parylene.

\* \* \* \* \*